(12) United States Patent
Guo et al.

(10) Patent No.: US 12,387,866 B2
(45) Date of Patent: Aug. 12, 2025

(54) INDUCTOR WITH SPECIAL-SHAPED STRUCTURE AND MANUFACTURING METHOD THEREOF

(71) Applicant: Shenzhen Sunlord Electronics Co., Ltd., Guangdong (CN)

(72) Inventors: Hai Guo, Guangdong (CN); Shengcheng Xia, Guangdong (CN); Qintian Hou, Guangdong (CN)

(73) Assignee: Shenzhen Sunlord Electronics Co., Ltd., Guangdong (CN)

( * ) Notice: Subject to any disclaimer, the term of this patent is extended or adjusted under 35 U.S.C. 154(b) by 790 days.

(21) Appl. No.: 17/707,933

(22) Filed: Mar. 29, 2022

(65) Prior Publication Data

US 2023/0162903 A1    May 25, 2023

Related U.S. Application Data

(63) Continuation of application No. PCT/CN2021/132458, filed on Nov. 23, 2021.

(51) Int. Cl.
*H01F 27/06* (2006.01)
*H01F 27/29* (2006.01)
*H01F 41/02* (2006.01)

(52) U.S. Cl.
CPC .......... *H01F 27/06* (2013.01); *H01F 27/292* (2013.01); *H01F 41/0233* (2013.01); *H01F 2027/065* (2013.01)

(58) Field of Classification Search
CPC .... H01F 27/06; H01F 27/292; H01F 41/0233; H01F 2027/065
See application file for complete search history.

(56) References Cited

U.S. PATENT DOCUMENTS

| | | | | |
|---|---|---|---|---|
| 11,317,545 B1* | 4/2022 | Perera | ..................... | H01F 27/22 |
| 2009/0195126 A1* | 8/2009 | Iwasaki | ................ | H03H 9/0509 |
| | | | | 310/353 |
| 2020/0152372 A1* | 5/2020 | Wei | ......... | H01F 17/04 |

(Continued)

FOREIGN PATENT DOCUMENTS

| CN | 206742050 U | 12/2017 |
|---|---|---|
| CN | 109390127 A | 2/2019 |
| CN | 113130185 A | 7/2021 |

(Continued)

*Primary Examiner* — Malcolm Barnes
(74) *Attorney, Agent, or Firm* — Winston Hsu

(57) ABSTRACT

An inductor with the special-shaped structure includes an inductor main body and a pair of supporting legs fixed below the inductor main body, wherein the pair of supporting legs is conductors and is electrically connected to a pair of electrodes of the inductor main body, and the pair of supporting legs is configured to support the inductor main body during installation, so that a gap space is left below the inductor main body. Due to the unique structural design of the inductor in the present invention, the utilization ratio of the area of the PCB can be effectively increased, and the inductor is particularly suitable for very-high-density component installation on the PCB during power application. Moreover, by changing relative positions of the supporting legs, lower cavities with different sizes may be formed below the inductor main body, thereby facilitating optimal design for meeting different demands.

9 Claims, 3 Drawing Sheets

(56) References Cited

U.S. PATENT DOCUMENTS

2021/0212192 A1 * 7/2021 Yamane .............. H01F 27/2852

FOREIGN PATENT DOCUMENTS

| JP | 11-308067 A | | 11/1999 |
|----|----|----|----|
| JP | 2003-163119 A | | 6/2003 |
| JP | 2004193076 A | * | 7/2004 |
| JP | 4003290 B2 | * | 11/2007 |
| WO | 2021/197513 A2 | | 10/2021 |

* cited by examiner

INDUCTOR WITH SPECIAL-SHAPED STRUCTURE AND MANUFACTURING METHOD THEREOF

CROSS REFERENCE TO RELATED APPLICATIONS

This application is a continuation application of PCT Application No. PCT/CN2021/132458, filed on Nov. 23, 2021. The content of the application is incorporated herein by reference.

BACKGROUND OF THE INVENTION

1. Field of the Invention

The present invention relates to an inductor, in particular to an inductor with a special-shaped structure and a manufacturing method thereof.

2. Description of the Prior Art

With the increasing miniaturization of an integrated circuit, the integration degree of a semiconductor has accordingly become higher and higher, and meanwhile, a higher demand has been further set for high-density packaging. In a case that the area of a PCB is fixed, in order to arrange more components, it is generally necessary to reduce the sizes of the components, however, the reduction of the size generally makes relevant characteristics of the components poor, and thus, design is not facilitated.

The disclosure of the contents in the background art is not certain to fall within the prior art of the present application, but is only used for helping the understanding of the inventive conception and technical solutions of the present application. However, the background art should not be used for evaluating the novelty and creativity of the present application in the case that there is no tangible evidence to suggest that the above-mentioned contents have been disclosed on the application date of the present application.

SUMMARY OF THE INVENTION

The main purpose of the present invention is to overcome defects in the background art, thereby providing an inductor with a special-shaped structure and a manufacturing method thereof, by which the utilization ratio of the space in the Z direction of a PCB is increased.

In order to achieve the above-mentioned purpose, the present invention adopts the following technical solutions.

Provided is an inductor with a special-shaped structure, including an inductor main body and a pair of supporting legs fixed below the inductor main body, wherein the pair of supporting legs is conductors and is electrically connected to a pair of electrodes of the inductor main body, and the pair of supporting legs is configured to support the inductor main body during installation, so that a gap space is left below the inductor main body.

Further, the pair of supporting legs is connected to the inductor main body by assembly; and preferably, the inductor main body is tightly welded together with the pair of supporting legs by reflow soldering.

Further, the pair of supporting legs is integrally and plastically packaged on a magnetic medium of the inductor main body.

Further, the pair of supporting legs is formed by bending terminal parts, extending to the outside of the magnetic medium of the inductor main body, of the pair of electrodes of the inductor main body.

Further, each of the supporting legs includes positioning pieces, a supporting surface and a tail part which are connected together, wherein the positioning pieces are located above the supporting surface, the tail part is located below the supporting surface, the supporting surface is bonded to the inductor main body located above and is in contact with the electrodes, sides of the inductor main body are positioned by the positioning pieces, and the tail part is vertically arranged to lift the inductor main body away from an insulation surface, thereby forming the gap space; preferably, the positioning pieces, the supporting surface and the tail part are of an integrally formed structure, the positioning pieces are upwards bent relative to the supporting surface, and the tail part is downwards bent relative to the supporting surface; preferably, each of the supporting legs includes three positioning pieces which are respectively arranged on three sides of the inductor main body; and preferably, the positioning pieces are in interference fit with the inductor main body.

Further, the pair of supporting legs is symmetrically arranged on two sides of the inductor main body, and the gap space is formed between the pair of supporting legs.

Further, the supporting legs are made of a conductive metal or soft magnetic material, and bottom ends of the supporting legs are subjected to surface metallization to form electrodes; and preferably, the thicknesses of the supporting legs are greater than 0.3 mm.

Provided is a manufacturing method of the inductor with the special-shaped structure, including the following steps:

S1, fixing a pair of supporting legs below an inductor main body, and electrically connecting the pair of supporting legs to a pair of electrodes of the inductor main body, wherein the pair of supporting legs is configured to support the inductor main body during installation, so that a gap space is left below the inductor main body;

preferably, the method further includes the following steps:

S2, coating the inductor main body and the pair of supporting legs with an insulating coating material to obtain a coated product of the inductor with the special-shaped structure; and S3, removing a part of coated layer on a tail part of each of the supporting legs, and then, performing surface metallization to form electrodes, thereby obtaining a finished product of the inductor with the special-shaped structure.

Further, in the step S1, the pair of supporting legs is connected to the inductor main body by assembly, and preferably, the inductor main body is tightly welded together with the pair of supporting legs by reflow soldering; or the pair of supporting legs is integrally and plastically packaged on a magnetic medium of the inductor main body; or terminal parts, extending to the outside of the magnetic medium of the inductor main body, of the pair of electrodes of the inductor main body are bent to form the pair of supporting legs.

Further, in the step S2, spraying, roll-spraying or dip-coating is adopted as a coating method; and in the step S3, sand blasting, laser peeling or mechanical grinding is adopted as a method for removing the coated layer, the surface metallization includes tin dipping, electroplating or PVD, and a metal component for the surface metallization is Ni or Sn.

The present invention has the following beneficial effects: the present invention provides an inductor with a special-shaped structure and a manufacturing method thereof. The inductor with the special-shaped structure includes an inductor main body and a pair of supporting legs fixed below the inductor main body, wherein the inductor main body is supported by the supporting legs, so that a certain gap space is left below the inductor main body. Due to the unique design of the inductor with the special-shaped structure in the present invention, an appropriate gap is provided for installing other components on a PCB located below the inductor main body, the utilization ratio of the area of the PCB can be effectively increased, and the inductor is particularly suitable for very-high-density component installation on the PCB during power application. Moreover, by changing sizes and relative positions of the pair of supporting legs, lower cavities with different sizes may be formed below the inductor main body, thereby facilitating optimal design for meeting different demands on installation layout of the different components.

When the inductor with the special-shaped structure in the present invention replaces a traditional inductor to be installed on the PCB, the utilization ratio of the space in the Z direction of the PCB can be increased, the size of the PCB can be favorably shortened, and the circuit design of the PCB also becomes more flexible.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
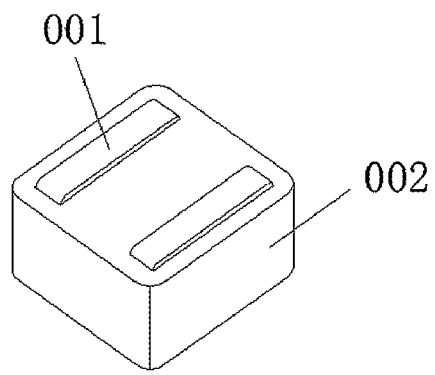
FIG. 1 is a schematic diagram showing a structure of an inductor main body according to embodiment 1 of the present invention.

The implementation manners of the present invention will be described in detail as below. It should be emphasized that the following descriptions are only exemplary, but are not intended to limit the scope and application of the present invention.

It should be noted that when a component is called to be "fixed" or "arranged" on the other component, it may be directly or indirectly located on the other component. When a component is called to be "connected to" another component, it may be directly or indirectly connected to the other component. In addition, connection may be used for both fixation and coupling or communication effects.

It should be understood that directional or positional relationships indicated by terms such as "length", "width", "upper", "lower", "front", "rear", "left", "right", "vertical", "horizontal", "top", "bottom", "inner" and "outer" are directional or positional relationships based on the accompanying drawings, are merely intended to facilitate describing the embodiments of the present invention and simplifying the description, rather than to indicate or imply that the appointed device or component has to be located in a specific direction or structured and operated in the specific direction so as not to be understood as restrictions on the present invention.

In addition, terms such as "first" and "second" are for descriptive purposes only, and cannot be understood as indicating or implying the relative importance or implicitly indicating the number of indicated technical features. Therefore, the features defined as "first" and "second" may explicitly or implicitly include at least one of the features. In the description of the embodiments of the present application, the meaning of "a plurality of" may be two or more, unless it may be specifically defined otherwise.

Reference is made to FIG. 1 to FIG. 9, an embodiment of the present invention provides an inductor with a special-shaped structure. The inductor includes an inductor main body 002 and a pair of supporting legs 012 fixed below the inductor main body 002, wherein the inductor main body 002 includes an internal coil (not shown) and a magnetic medium 009 coating the internal coil, a pair of electrodes 001 is formed on two ends of the internal coil, the pair of supporting legs 012 is conductors and is electrically connected to the pair of electrodes 001 of the inductor main body 002, and the pair of supporting legs 012 is configured to support the inductor main body 002 during installation, so that a gap space is left below the inductor main body 002. When the inductor with the special-shaped structure is installed on a PCB (not shown), a lower cavity may be formed between the downside of the inductor main body 002 and the PCB, and the lower cavity provides an installation space for other components, so that the utilization ratio of the space in the Z direction of the PCB is increased. It should be understood that the inductor with the special-shaped structure in the present invention may include more supporting legs such as three or four supporting legs, but is not limited to the pair of supporting legs 012 as long as they may provide support for the inductor main body 002 when the inductor with the special-shaped structure is installed, thereby providing a certain installation space for other components between the downside of the inductor main body 002 and the PCB.

Reference is made to FIG. 2 to FIG. 6, in some embodiments, the pair of supporting legs 012 is connected to the inductor main body 002 by assembly. Preferably, and the inductor main body 002 is tightly welded together with the pair of supporting legs by reflow soldering.

Figure 7:
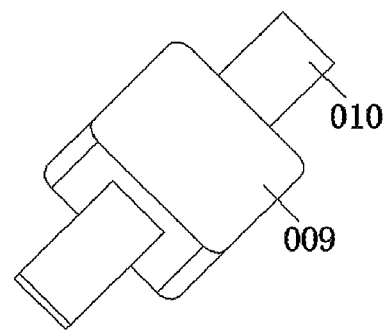
FIG. 7 is a schematic diagram showing a structure of a formed semi-finished product of an inductor with a special-shaped structure according to embodiment 2 of the present invention.
Figure 8:
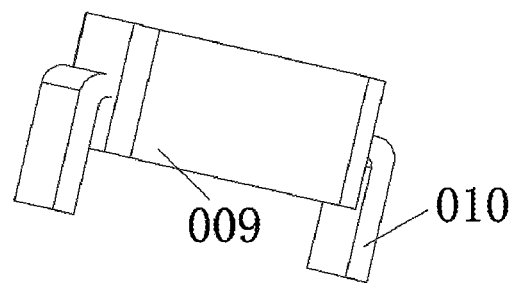
FIG. 8 is a schematic diagram showing a structure of a coated semi-finished product of the inductor with the special-shaped structure according to embodiment 2 of the present invention.

Reference is made to FIG. 7 to FIG. 8, in some other embodiments, the pair of supporting legs is formed by bending terminal parts 010, extending to the outside of the magnetic medium 009 of the inductor main body 002, of the pair of electrodes of the inductor main body 002. The terminal parts 010 may be two line tails of the internal coil and may also be two additional terminals embedded into the magnetic medium 009 and connected with the line tails of the internal coil.

Figure 9:
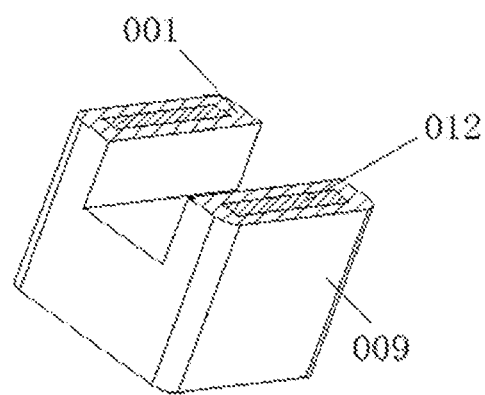
FIG. 9 is a schematic diagram showing a structure of a finished product

Reference is made to FIG. 9, in some further embodiments, the pair of supporting legs 012 is integrally and plastically packaged on the magnetic medium 009 of the inductor main body 002, and therefore, a supporting structure provided with the gap space and located below the inductor main body 002 is formed. The pair of supporting legs 012 is electrically connected to the pair of electrodes of the inductor main body 002 in the magnetic medium 009.

Figure 2:
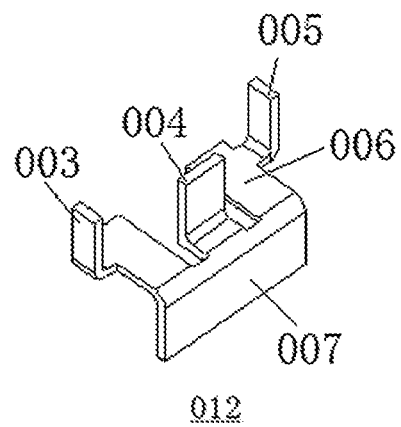
FIG. 2 is a schematic diagram showing a structure of a supporting leg according to embodiment 1 of the present invention.

Reference is made to FIG. 2 to FIG. 6, in a preferred embodiment, each of the supporting legs includes positioning pieces 003 to 005, a supporting surface 006 and a tail part 007 which are connected together, wherein the positioning pieces 003 to 005 are located above the supporting surface 006, the tail part 007 is located below the supporting surface 006, the supporting surface 006 is bonded to the inductor main body 002 located above and is in contact with the electrodes 001, sides of the inductor main body 002 are positioned by the positioning pieces 003 to 005, and the tail part 007 is vertically arranged to lift the inductor main body 002 away from an insulation surface of the PCB, thereby forming the gap space. As shown in FIG. 2, in more preferred embodiments, the positioning pieces 003 to 005, the supporting surface 006 and the tail part 007 are of an integrally formed structure, the positioning pieces 003 to 005 are upwards bent relative to the supporting surface 006, and the tail part 007 is downwards bent relative to the supporting surface 006.

In order to meet different demands on the gap space below the inductor main body, the supporting legs may be arranged in different manners. On the premise that the size of the inductor main body is unchanged, the size of the gap space below the inductor with the special-shaped structure is changed by changing the sizes of the positioning pieces and the supporting surfaces of the supporting legs and the bending lengths of the supporting legs, and thus, the different demands of the gap space are met.

As shown in FIG. 1, in some embodiments, the inductor main body may be of a cuboid or cube. As shown in FIG. 2 to FIG. 6, in a particularly preferred embodiment, each of the supporting legs includes three positioning pieces 003, 004 and 005 which are respectively arranged on three sides of the inductor main body 002 of the cuboid or cube so as to firmly position the inductor main body 002.

As shown in FIG. 3 to FIG. 6, in a preferred embodiment, the positioning pieces 003 to 005 are in interference fit with the inductor main body 002.

Figure 4:
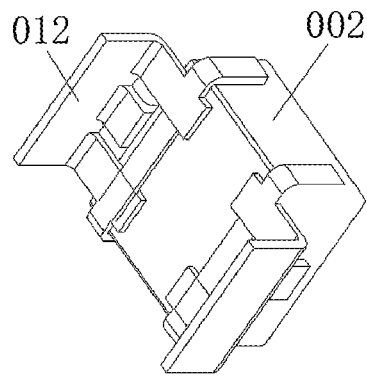
FIG. 4 is a schematic diagram showing a structure of an assembled semi-finished product of an inductor with a special-shaped structure according to embodiment 1 of the present invention.
Figure 5:
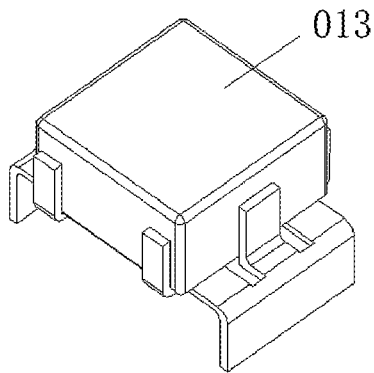
FIG. 5 is a schematic diagram showing a structure of a coated product of the inductor with the special-shaped structure according to embodiment 1 of the present invention.
Figure 6:
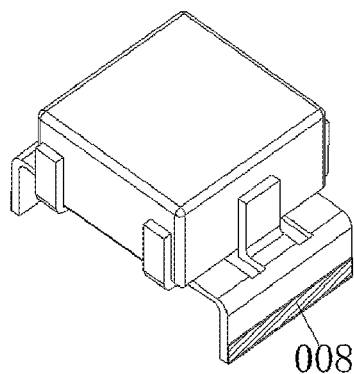
FIG. 6 is a schematic diagram showing a structure of a finished product of the inductor with the special-shaped structure according to embodiment 1 of the present invention.

As shown in FIG. 4 to FIG. 6, in a preferred embodiment, the pair of supporting legs is symmetrically arranged on two sides of the inductor main body 002, and the gap space is formed between the pair of supporting legs.

In some embodiments, the supporting legs may be made of a conductive metal (which may be a hard copper substrate, for example, but is not limited to the hard copper substrate) or soft magnetic material, and bottom ends of the supporting legs are subjected to surface metallization to form electrodes to be electrically connected to the PCB. In a preferred embodiment, the thicknesses of the supporting legs are greater than 0.3 mm, so that it is ensured that the overall structure is not easy to deform.

Reference is made to FIG. 1 to FIG. 9, an embodiment of the present invention further provides a manufacturing method of the inductor with the special-shaped structure, including the following steps:

S1, a pair of supporting legs is fixed below an inductor main body 002, and the pair of supporting legs is electrically connected to a pair of electrodes 001 of the inductor main body 002, wherein the pair of supporting legs is configured to support the inductor main body 002 during installation, so that a gap space is left below the inductor main body 002.

In a preferred embodiment, the method further includes the following steps:

S2, the inductor main body 002 and the pair of supporting legs are coated with an insulating coating material to form an insulating coated layer 013, thereby obtaining a coated product of the inductor with the special-shaped structure. The insulating coated layer 013 is formed on the surfaces of the inductor main body 002 and the magnetic medium 009, so that the insulation property and corrosion resistance of the product can be effectively improved; and S3, a part of insulating coated layer on a tail part 007 of each of the supporting legs is removed, and then, surface metallization is performed to form electrodes, thereby obtaining a finished product of the inductor with the special-shaped structure. The insulating coated layer on the tail part 007 of each of the supporting legs is removed, and then, the electrodes 008 connected with the PCB are metallized, so that the problem of tin climbing during use can be avoided.

In some embodiments, the step S1 that the pair of supporting legs is fixed below the inductor main body 002 includes: the pair of supporting legs is connected to the inductor main body 002 by assembly, and preferably, the inductor main body 002 is tightly welded together with the pair of supporting legs by reflow soldering.

In some embodiments, the step S1 that the pair of supporting legs is fixed below the inductor main body 002 includes: the pair of supporting legs is integrally and plastically packaged on a magnetic medium 009 of the inductor main body 002, wherein the pair of supporting legs is in contact with the pair of electrodes of the inductor main body 002 respectively inside the magnetic medium 009.

In some embodiments, the step S1 that the pair of supporting legs is fixed below the inductor main body 002 includes: terminal parts 010, extending to the outside of the magnetic medium 009 of the inductor main body 002, of the pair of electrodes of the inductor main body 002 are bent to form the pair of supporting legs.

In some embodiments, in the step S2, spraying, roll-spraying, dip-coating and the like may be adopted as a method for forming the insulating coated layer 013 on the surfaces of the inductor main body 002 and the magnetic medium 009.

In some embodiments, in the step S3, sand blasting, laser peeling, mechanical grinding and the like may be adopted as a method for removing a part of insulating coated layer on the tail part 007 of each of the supporting legs.

In some embodiments, in the step S3, a method for forming the electrodes by the surface metallization includes tin dipping, electroplating, PVD and the like, and a metal component for the surface metallization may be Ni, Sn and the like.

The inductor with the special-shaped structure, provided by the present invention, includes an inductor main body and a pair of supporting legs fixed below the inductor main body, wherein the inductor main body is supported by the supporting legs, so that a certain gap space is left below the inductor main body. Due to the unique design of the inductor with the special-shaped structure in the present invention, an appropriate gap is provided for installing other components on a PCB located below the inductor main body, the utilization ratio of the area of the PCB can be effectively increased, and the inductor is particularly suitable for very-high-density component installation on the PCB during power application. Moreover, by changing sizes and relative positions of the pair of supporting legs, lower cavities with different sizes may be formed below the inductor main body, thereby facilitating optimal design for meeting different demands on installation layout of the different components. When a traditional inductor is replaced with the inductor with the special-shaped structure in the present invention to be installed on the PCB, the utilization ratio of the space in the Z direction (a direction vertical to the PCB) of the PCB can be increased, the size of the PCB can be favorably shortened, miniaturization is promoted, and the circuit design of the PCB also becomes more flexible.

Specific embodiments of the present invention will be further described below.

In some embodiments, the inductor main body 002 may be an SMD inductor or a DIP inductor. The inductor main body 002 is unlimited in shape and size and may be of various shapes such as a cylinder, a cuboid and a cube. The inductor main body 002 may be provided with the electrodes at the bottom or sides. The inductor main body 002 includes an internal coil (not shown) and a magnetic medium 009 coating the internal coil, and line tails of the internal coil may be extended to form the electrodes 001 exposed on the sides or bottom of the inductor main body 002. Two ends of the internal coil may also be connected with additional terminals embedded into the magnetic medium 009, the terminals extend from the inside of the magnetic medium 009 to the outside, and parts, exposed out of the magnetic medium 009, of the terminals form the electrodes 001 on the sides or bottom of the inductor main body 002.

In some embodiments, the pair of supporting legs may be of an additional structure on the inductor main body 002 and are assembled and connected together with the inductor main body 002. In some other embodiments, the pair of supporting legs may also be integrally and plastically packaged on the magnetic medium 009 of the inductor main body 002 to form an integrated structure with the inductor main body 002. In some further embodiments, the pair of supporting legs may also be formed by bending terminal parts, extending to the outside of the magnetic medium 009, of electrodes of the inductor main body 002. The inductor main body 002 is supported by the pair of supporting legs, so that a certain gap space is left below the inductor main body 002, which is equivalent to that a lower cavity is formed below the inductor main body 002. When the inductor with the special-shaped structure is installed on the PCB, the lower cavity may be used for installing other components. By changing relative positions and sizes of the supporting legs, lower cavities capable of meeting different size demands can be manufactured, thereby facilitating optimal design for a circuit of the PCB.

A material of the supporting legs may adopt a conductive metal or soft magnetic material, but is not limited to the conductive metal or soft magnetic material. With overall consideration of the weight of the inductor main body 002 and the non-deformability of the supporting legs, the supporting legs may be formed by a hard copper substrate or other hard metals which are easily conductive, so that the inductor with the special-shaped structure is prevented from deforming in use. The supporting legs are convenient to weld after being subjected to surface metallization.

Preferably, the thicknesses of the supporting legs are selected to be greater than 0.3 mm on the premise that the specification is allowed, so that it is ensured that the overall structure is no easy to deform.

In some embodiments, the tail part of each of the supporting legs may be bent to form a shape similar to a characteristic "ji", so that the contact area of a supporting frame and a pad is increased when the supporting frame is welded.

In some embodiments, a manufacturing method of an inductor with a special-shaped structure includes the following steps:

step S1, a pair of additional supporting legs is assembled and connected to an inductor main body 002, and the supporting legs are electrically connected to a pair of electrodes of the inductor main body 002;

or, a pair of supporting legs is integrally and plastically packaged on a magnetic medium 009 of an inductor main body 002, wherein the pair of supporting legs is electrically connected to a pair of electrodes of the inductor main body 002 in the magnetic medium 009;

or, terminal parts 010, extending to the outside of a magnetic medium 009 of an inductor main body 002, of a pair of electrodes of the inductor main body 002 are bent to form a pair of supporting legs;

step S2, the surface of an assembled product of the inductor with the special-shaped structure in the step S1 or a bent semi-finished product of the supporting legs is coated to obtain a coated product of the inductor with the special-shaped structure; and step S3, an insulating coated layer on the tail part of each of the supporting legs of the coated product of the inductor with the special-shaped structure in the step S2 is removed, and then, metallization is performed to form a finished product of the inductor with the special-shaped structure.

Further, in the step S1, the assembly and connection may include the step that the supporting legs are fixed on the inductor main body after being coated with a tin paste by virtue of a steel mesh and being subjected to reflow soldering.

Further, in the step S1, the two supporting legs are positioned and matched with the inductor main body by interference fit to ensure that the relative positions of the two supporting legs and the inductor main body are not easy to change, so that the consistency after the supporting legs are assembled is ensured, and it is ensured that the space reserved below the inductor main body meets a demand.

Further, the coating in the step S2 includes spraying, roll-spraying or dip-coating and other manners.

The thermally-treated inductor is coated with an insulating material to form an insulating material coated layer, and thus, the corrosion resistance and insulation property of the inductor product can be improved.

Further, a method for removing the insulating coated layer of the electrodes in the step S5 includes sand blasting, laser peeling, mechanical grinding and the like, and a metallization method includes tin dipping, electroplating or PVD. A metal component for the surface metallization may include Ni, Sn and the like.

Embodiment 1

Figure 3:
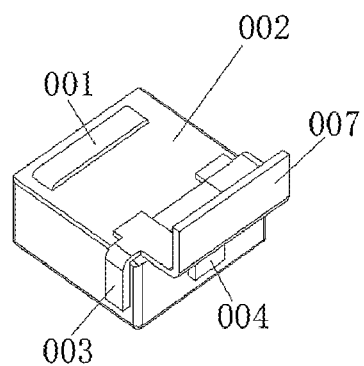
FIG. 3 is a schematic diagram after the inductor main body and single supporting leg are assembled according to embodiment 1 of the present invention.

A manufacturing method of an inductor with a special-shaped structure includes the following steps:
step 1, tin paste coating: an inductor main body 002 is implanted into a die and is covered with a mask plate, electrodes 001 of the inductor main body are exposed, and then, the exposed electrodes 001 are coated with a tin paste, as shown in FIG. 1;
step 2, supporting leg assembly: one of the supporting legs as shown in FIG. 2 is distributed and assembled on each of two sides of the inductor main body 002, as shown in FIG. 3. During assembly, supporting surfaces 006 of the pair of supporting legs are respectively bonded to the pair of electrodes 001 coated with the tin paste in the step 1, positioning pieces 003 and 005 on two sides and a positioning piece 004 in the middle of each of the supporting legs are bonded to the inductor main body 002, so that firm assembly and stable cavity size are ensured;
step 3, reflow soldering: as shown in FIG. 4, the inductor main body 002 and the supporting legs which are assembled in the step 2 are tightly welded together by reflow soldering to form an assembled product of the inductor with the special-shaped structure;
step 4, coating: as shown in FIG. 5, the surface of the assembled product of the inductor with the special-shaped structure in the step 3 is coated with an insulating coating material to obtain a coated product of the inductor with the special-shaped structure; and
step 5, metallization: as shown in FIG. 6, a part of coated layer on a tail part 007 of each of the supporting legs of the coated product of the inductor with the special-shaped structure in the step 4 is removed, and then, metallization (such as electroplating) is performed to obtain final electrodes 008 of the inductor with the special-shaped structure, thereby obtaining a finished product. A schematic diagram of the finished product is shown in FIG. 6.

Embodiment 2

A manufacturing method of an inductor with a special-shaped structure includes the following steps:
step 1, as shown in FIG. 7, when an inductor main body is manufactured, the inductor main body and terminals connected with an internal coil of the inductor main body are embedded into a magnetic medium 009 to form a device with an integrated structure, wherein the terminals are provided with terminal parts 010 extending to the outside of the magnetic medium 009;
step 2, as shown in FIG. 8, the size of a cavity required below the magnetic medium 009 is affirmed in combination with a design demand, the terminal parts 010 of the device with the integrated structure are bent for 90 degree to form supporting legs, and thus, a lower cavity meeting the size design demand is obtained; and
step 3, the supporting legs obtained after the device is bent are treated according to the steps 4 and 5 in embodiment 1 to obtain a finished product of the inductor with the special-shaped structure, wherein a schematic diagram of a coated semi-finished product obtained in the step 4 in embodiment 1 is shown in FIG. 8.

Embodiment 3

A manufacturing method of an inductor with a special-shaped structure includes the following steps:
step 1, as shown in FIG. 9, when an inductor main body 002 is manufactured, supporting legs 012 are embedded into a magnetic medium 009 of the inductor main body 002 to form a device with an integrated structure, wherein the device with the integrated structure is provided with a lower cavity formed by the supporting legs 012; and
step 2, as shown in FIG. 9, the device with the integrated structure is coated with an insulating material, and bottoms of the supporting legs 12 are metallized to form electrodes 001.

Different from embodiment 1 and embodiment 2, embodiment 3 is beneficial to the increment of sizes of the electrodes and facilitates product welding. A schematic diagram of a finished product is shown in FIG. 9.

The background part of the present invention may include background information including problems or environments related to the present invention, but is not certain to describe the prior art. Therefore, the contents included in the background art should not be taken as an acknowledgment of an applicant to the prior art.

The above-mentioned contents are further detailed descriptions of the present invention in conjunction with the specific/preferred implementation manners, but cannot affirm that the specific implementations of the present invention are only limited to these descriptions. The ordinary skill in the art to which the present invention belongs may make several replacements or variations on these described implementation manners without departing from the conception of the present invention, and these replacement or variation manners should be regarded to fall within the protection scope of the present invention. In the descriptions of the present description, descriptions for reference terms "an embodiment", "some embodiments", "a preferred embodiment", "an example", "a specific example" or "some examples" mean that specific features, structures, materials or characteristics described in conjunction with the embodiment or example are included in at least one embodiment or example of the present invention. In the present description, the schematic representation for the above-mentioned terms is not necessary for the same embodiment or example. Moreover, the described specific features, structures, materials or characteristics may be combined in any one or more embodiments or examples in an appropriate manner. The different embodiments or examples or features of the different embodiments or examples described in the present description may be incorporated or combined by the skilled in the art without mutual conflicts. Although the embodiments of the present invention and advantages thereof have been described in detail, it may be understood that various changes, replacements or alterations may be made herein without departing from the protection scope of the patent application.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An inductor with a special-shaped structure, comprising an inductor main body and a pair of supporting legs fixed below the inductor main body, wherein the pair of supporting legs is conductors and is electrically connected to a pair of electrodes of the inductor main body, and the pair of supporting legs is configured to support the inductor main body during installation, so that a gap space is left below the inductor main body, wherein the supporting legs are made of a conductive metal or soft magnetic material, and bottom ends of the supporting legs are subjected to surface metallization to form electrodes; and the thicknesses of the supporting legs are greater than 0.3 mm.

2. The inductor with the special-shaped structure of claim 1, wherein the pair of supporting legs is connected to the inductor main body by assembly; and the inductor main body is tightly welded together with the pair of supporting legs by reflow soldering.

3. The inductor with the special-shaped structure of claim 1, wherein the pair of supporting legs is integrally and plastically packaged on a magnetic medium of the inductor main body.

4. The inductor with the special-shaped structure of claim 1, wherein the pair of supporting legs is formed by bending terminal parts, extending to the outside of the magnetic medium of the inductor main body, of the pair of electrodes of the inductor main body.

5. The inductor with the special-shaped structure of claim 1, wherein each of the supporting legs comprises positioning pieces, a supporting surface and a tail part which are connected together, wherein the positioning pieces are located above the supporting surface, the tail part is located below the supporting surface, the supporting surface is bonded to the inductor main body located above and is in contact with the electrodes, sides of the inductor main body are positioned by the positioning pieces, and the tail part is vertically arranged to lift the inductor main body away from an insulation surface, thereby forming the gap space; the positioning pieces, the supporting surface and the tail part are of an integrally formed structure, the positioning pieces are upwards bent relative to the supporting surface, and the tail part is downwards bent relative to the supporting surface; each of the supporting legs comprises three positioning pieces which are respectively arranged on three sides of the inductor main body; and the positioning pieces are in interference fit with the inductor main body.

6. The inductor with the special-shaped structure of claim 1, wherein the pair of supporting legs is symmetrically arranged on two sides of the inductor main body, and the gap space is formed between the pair of supporting legs.

7. A manufacturing method of the inductor with the special-shaped structure of claim 1, comprising the following steps:
S1, fixing a pair of supporting legs below an inductor main body, and electrically connecting the pair of supporting legs to a pair of electrodes of the inductor main body, wherein the pair of supporting legs is configured to support the inductor main body during installation, so that a gap space is left below the inductor main body;
the method further comprising the following steps:
S2, coating the inductor main body and the pair of supporting legs with an insulating coating material to obtain a coated product of the inductor with the special-shaped structure; and
S3, removing a part of coated layer on a tail part of each of the supporting legs, and then, performing surface metallization to form electrodes, thereby obtaining a finished product of the inductor with the special-shaped structure.

8. The method of claim 7, wherein in the step S1, the pair of supporting legs is connected to the inductor main body by assembly, and the inductor main body is tightly welded together with the pair of supporting legs by reflow soldering; or the pair of supporting legs is integrally and plastically packaged on a magnetic medium of the inductor main body; or terminal parts, extending to the outside of the magnetic medium of the inductor main body, of the pair of electrodes of the inductor main body are bent to form the pair of supporting legs.

9. The method of claim 7, wherein in the step S2, spraying, roll-spraying or dip-coating is adopted as a coating method; and in the step S3, sand blasting, laser peeling or mechanical grinding is adopted as a method for removing the coated layer, the surface metallization comprises tin dipping, electroplating or PVD, and a metal component for the surface metallization is Ni or Sn.

* * * * *